United States Patent [19]

Sato

[11] Patent Number: 4,904,993

[45] Date of Patent: Feb. 27, 1990

[54] REMOTE CONTROL APPARATUS WITH SELECTABLE RF AND OPTICAL SIGNAL TRANSMISSION

[75] Inventor: Kazuo Sato, Iwanuma, Japan

[73] Assignee: Alps Electric Co., Ltd., Japan

[21] Appl. No.: 12,013

[22] Filed: Feb. 9, 1987

[30] Foreign Application Priority Data

May 16, 1986 [JP] Japan ............................. 61-73686[U]

[51] Int. Cl.[4] ............................................... H04Q 7/00

[52] U.S. Cl. ....................... 340/825.570; 340/825.720; 340/825.690; 455/603

[58] Field of Search ....................... 340/825.57, 825.56, 340/825.31, 825.72, 825.69; 455/59, 134, 303, 603, 127, 103

[56] References Cited

U.S. PATENT DOCUMENTS

| | | | |
|---|---|---|---|
| 3,112,486 | 11/1963 | Adler | 455/59 |
| 3,513,443 | 5/1970 | Andersen | 340/825.44 |
| 3,590,271 | 6/1971 | Peters | 340/825.72 |
| 4,412,218 | 10/1983 | Niitsu | 340/825.56 |
| 4,415,065 | 11/1983 | Sandstedt | 340/365.5 |
| 4,422,071 | 12/1983 | de Graaf | 340/825.44 |
| 4,509,093 | 4/1985 | Stellberger | 340/825.31 |
| 4,531,115 | 7/1985 | Black et al. | 340/539 |
| 4,539,710 | 9/1985 | Dinsmore | 455/134 |

*Primary Examiner*—Donald J. Yusko

*Attorney, Agent, or Firm*—Guy W. Shoup; Paul J. Winters; Brian D. Ogonowsky

[57] ABSTRACT

A communication apparatus for a remote control apparatus, for example, in order to lock or unlock doors or a trunk of a vehicle selects a radio signal or optical signal in accordance with the conditions between the transmitter and receiver. Its transmitter is provided with a radio signal sending circuit, an optical signal sending circuit and a selection circuit which selects any one circuit for operation and a receiver which is provided with a radio signal receiving circuit which receives a radio signal transmitted from said radio signal sending circuit and an optical signal receiving circuit which receives an optical signal transmitted from said optical signal sending circuit.

1 Claim, 1 Drawing Sheet

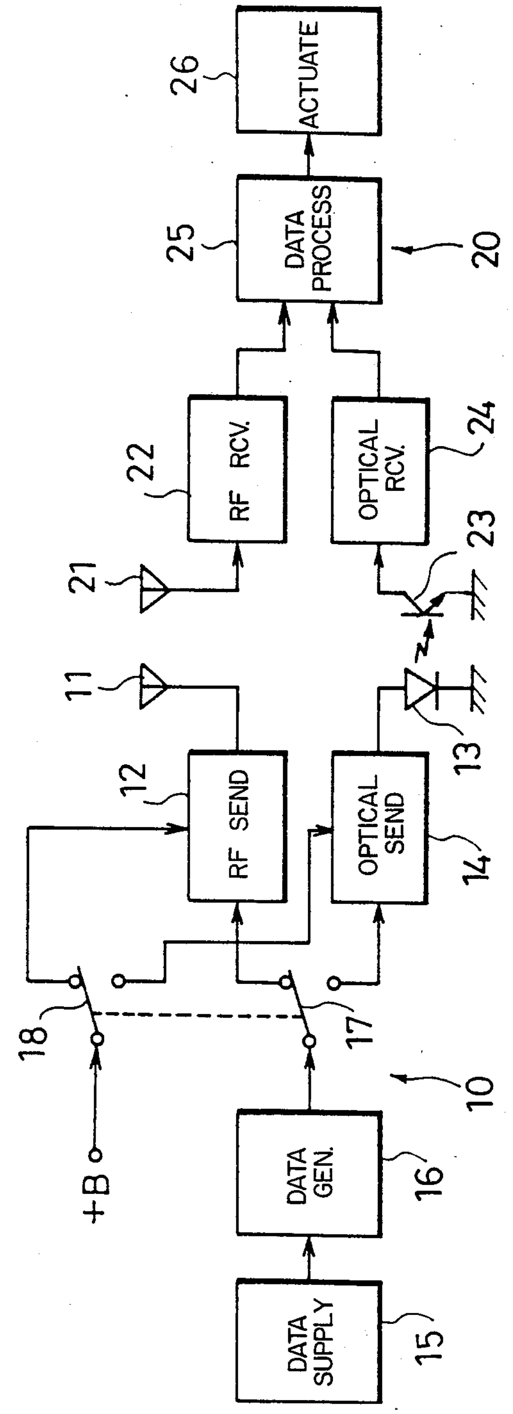
ACTUATE
26
DATA PROCESS
25
20
RF RCV.
22
OPTICAL RCV.
24
21
23
11
RF SEND
12
OPTICAL SEND
14
13
18
17
+B
10
DATA GEN.
16
DATA SUPPLY
15

REMOTE CONTROL APPARATUS WITH SELECTABLE RF AND OPTICAL SIGNAL TRANSMISSION

FIELD OF THE INVENTION

The present invention relates to a communication apparatus which realizes communication by adequately selecting an electrical radio signal and an optical signal.

BACKGROUND OF THE INVENTION

A remote control apparatus has been used for remotely controlling the locking or unlocking of doors or trunk room of vehicle. This remote control apparatus utilizes an electrical radio signal or an optical signal. The remote control apparatus which utilizes radio signal operates an adequate actuator in accordance with data for locking and unlocking of doors or trunk room of vehicle by transmitting a radio signal moduleted by data from the transmitter carried by an operator and then receiving such radio signal with the receiver mounted to vehicle. Meanwhile, the remote control apparatus which utilizes an optical signal transmits an optical signal from the transmitter carried by an operator to the receiver mounted to vehicle and realizes locking or unlocking of doors or trunk room of vehicle in accordance with data with the receiver which has received such optical signal.

However, the remote control apparatus which utilizes radio signal described above provides an advantage that the remote control can be realized within the transmission range of radio signal due to the characteristic of radio frequency even when there is some shielding materials but also provides a problem that that the radio signal is transmitted with much power consumption and the operation life of a power supply battery comprised in the transmitter is comparatively short.

On the other hand, the remote control apparatus which utilizes an optical signal provides an advantage that power consumption for transmitting an optical signal is only one several tenths the power consumption for transmitting radio signal and thereby operation life of the power supply battery of transmitter can be extended but it also provides a disadvantage that the optical signal cannot be transmitted if there is a shielding materal such as a person or vehicle between the transmitter and receiver and therefore remote control is possible only within the visible distance.

SUMMARY OF THE INVENTION

With such background of the remote control apparatus of the prior art, the present inventon has been proposed and therefore it is an object of the present invention to provide a communication apparatus which realizes communication by freely selecting any one desired signal among the radio signal or optical signal in accordance with the conditions between the transmitter and receiver.

In order to achieve such object, the communication apparatus of the present invention comprises a transmitter which is provided with a radio signal sending means, an optical signal sending means and a selection means which selects any one desired means for operation and a receiver which is provided with a radio signal receiving means which receives a radio signal transmitted from said radio signal sending means and an optical signal receiving means which receives an optical signal transmitted from said optical signal sending means.

Since any one desired means among the radio signal sending mens and optical signal sending means provided to the transmitter can be set to the operating condition by the selecting means, communication can be realized with the radio signal in case distance between the transmitter and receiver is far and there is a shielding material between them, or with the optical signal in case distance is comparatively short and there is no shielding means between them, thereby lowering power consumption.

BRIEF DESCRIPTION OF THE DRAWINGS

The drawing attached is a block diagram of a preferred embodiment of the present invention.

DETAILED DESCRIPTION OF THE INVENTION

A preferred embodiment of the present invention is explained with reference to the attached drawing. The figure is a block diagram of a preferred embodiment of the communication apparatus to which the present invention is applied.

In this figure, a transmitter 10 comprises a radio signal sending means consisting of a transmitting antenna 11 and a radio signal sending circuit 12 and an optical signal sending means consisting of a photodiode 13 and an optical signal sending circuit 14 which drives said diode. Moreover, data is output from a data generating circuit 16 through operation of a data selection circuit 15 and this data is switched by a switch 17 and is then given to any one of the radio signal sending circuit 12 or optical signal sending circuit 14. In conjunction with switching operation of the switch 17, a power supply voltage is supplied to any one of the radio signal sending circuit 12 or optical signal sending circuit 14 by another switch 18 in order to operate such circuit. The selection means is formed by these switches 17 and 18.

Moreover, the receiver 20 comprises a radio signal receiving means consisting of a receiving antenna 21 and a radio signal receiving circuit 22 and an optical signal receiving means consisting of a phototransistor 23 and an optical signal receiving circuit 24. In addition, the data output from these radio signal receiving circuit 22 and optical signal receiving circuit 24 are given to the data procesiing circuit 25 and processed adequately. Thereby, the actuator 26 is operated in accordance with the data, locking or unlocking doors or trunk room of vehicle.

In such a structure, when distance between the transmitter 10 and the receiver 20 is far or when a person is standing or there is a shielding material between them, the switches 17, 18 are changed over so that data is given to the radio signal sending circuit 12 and the power supply voltage is applied thereto. Thereby, a radio signal is transmitted from the transmitting antenna 11 and this signal is received by the receiving antenna 21 of the receiver 20 and data is given to the data processing circuit 25 through a radio signal receiving circuit 22. Meanwhile, when distance between the transmitter 10 and the receiver 20 is comparatively short and there is no shielding material between them resulting in direct observation, the switches 17 and 18 are reversely changed over so that data is given to the optical signal sending circuit 14 and the power supply voltage is also applied thereto. Thereby, an optical signal is sent to the receiver 20 from the photo diode 13 and it is received by the photo transistor 23 of receiver 20. The data is then applied to the data processing circuit 25 through the optical signal receiving circuit 24. This communication by the optical signal requires electrical power for sending optical signal of only one several tenths the electrical power required for sending radio signal and thereby operation life of power supply battery comprised in the transmitter 10 can be extended. Moreover, a voltage of power supply voltage for sending an optical signal is lower than the voltage of that for sending radio signal and even in case the radio signal cannot be transmitted because a voltage is a little lowered due to discharge of power supply battery of transmitter 10, the optical signal can be sent, assuring reliability of communication in such a case.

In above embodiment, the photodiode 13 is driven by the optical signal sending circuit 14, but it may directly be driven with data output from the data generating circuit 16. Moreover, the communication apparatus of the present invention has been explained through application into a remote control apparatus for remotely controlling locking and unlocking of doors and trunk room of vehicles, but it is not limited only to such application and it can, of source, be applied to the remote control apparatus for remotely controlling electronic devices.

As explained above, the communication apparatus of the present invention is capable of setting any one of the radio signal sending means and the optical signal sending means provided to the transmitter to the operating condition with the selection means. Therefore communication can be realized with the radio signal in case distance between transmitter and receiver is far or there is a shielding material between them, or with the optical signal in case distance is comparatively short and there is no shielding material between them, resulting in low power consumption. Moreover, the present invention provides following excellent effect that even when the electrical power of transmitter is consumed and tansmission by radio signal becomes impossible, communication can be realized with the optical signal, assuring reliability of communication.

What is claimed is:

1. A remote control communication apparatus comprising: a transmitter having a radio signal sending circuit connected to a transmitting antenna, an optical signal sending circuit connected to a light emitting element, data supplying means for supplying data to be transmitted by one of said radio signal sending circuit and said optical signal sending circuit, a battery power source, and switching means for selectively switching said data supplying means and said battery power source to one of said radio and optical signal sending circuits, wherein said optical signal sending circuit has the characteristic of requiring substantially less power from said battery power source for sending an optical signal than said radio signal sending circuit requires to send a radio signal; and a receiver having a radio signal receiving circuit connected to a receiving antenna for receiving the radio signal from said transmitter, an optical signal receiving circuit connected to a light detecting element for receiving the optical signal from said transmitter, and data processing means for processing data received by said radio signal receiving circuit and said optical signal receiving circuit, whereby, when a user provided said the transmitter is within unimpeded visual range of a location where said receiver is installed, the user can switch over said switching means to transmit an optical signal to said receiver in order to save consumption of power from said battery power source.

* * * * *